March 22, 1966  H. J. SAMUEL ET AL  3,241,345
PRESS WITH TOOL CHANGING DEVICE
Filed Jan. 7, 1963  3 Sheets-Sheet 1

INVENTOR
HERBERT JOHN SAMUEL
BY
Hammond & Littell
ATTORNEYS

March 22, 1966   H. J. SAMUEL ET AL   3,241,345
PRESS WITH TOOL CHANGING DEVICE
Filed Jan. 7, 1963   3 Sheets-Sheet 2
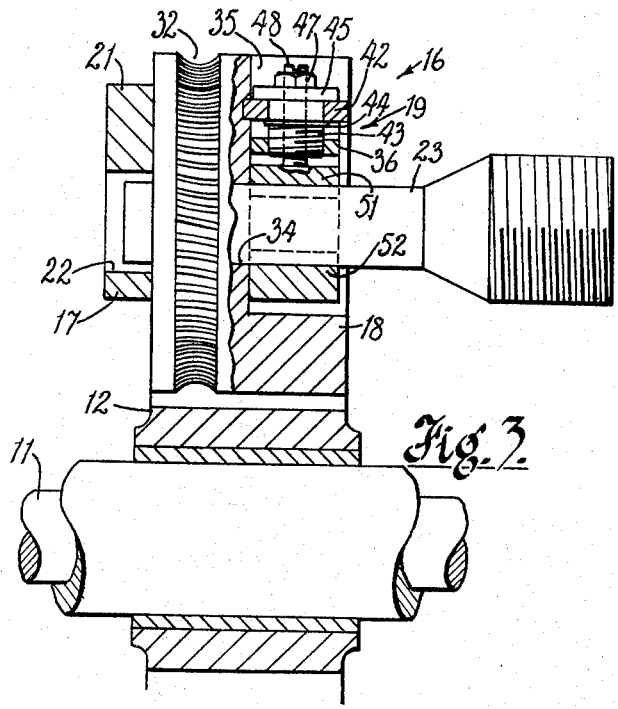
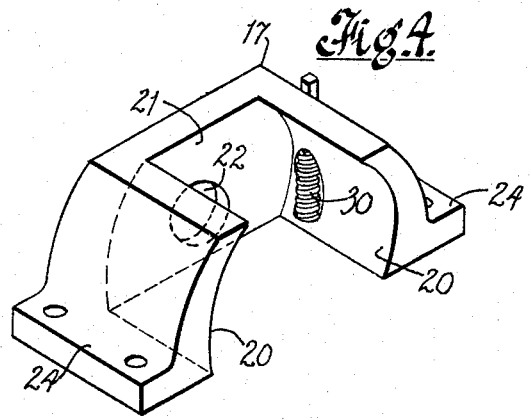
INVENTOR
HERBERT JOHN SAMUEL
BY
ATTORNEYS March 22, 1966 H. J. SAMUEL ET AL 3,241,345
PRESS WITH TOOL CHANGING DEVICE
Filed Jan. 7, 1963 3 Sheets-Sheet 3

INVENTOR
HERBERT JOHN SAMUEL
BY
ATTORNEYS

United States Patent Office 3,241,345
Patented Mar. 22, 1966

3,241,345
PRESS WITH TOOL CHANGING DEVICE
Herbert John Samuel, Northbourne, Bournemouth, England (41 Spur Hill Ave., Parkstone, Poole, Dorset, England)
Filed Jan. 7, 1963, Ser. No. 276,683
Claims priority, application Great Britain, Jan. 9, 1962, 752/62; Mar. 16, 1962, 10,287/62
(Filed under Rule 47(b) and 35 U.S.C. 118)
7 Claims. (Cl. 72—263)

This invention relates to presses for working metals in billet form by an operation in which a stem-shaped tool enters a billet placed in a container of the press. Among these operations are the extrusion, the piercing and the upsetting of billets, and the tools are either solid or hollow stems, mandrels or punches, according to the nature of the operation. These tools are generally mounted on a holder which is driven by a main ram of the press, the tools being readily detachable from the holder for replacement purposes. Replacement of a tool may be necessary for a variety of reasons such as wear or accidental damage, or because a tool has to be exchanged for one of a different size. According to the type of holder employed, the tool must be either moved axially or rotated relative to the holder, or both, before separation can be effected.

The tools of many conventional presses are heavy and bulky, and removal of a tool from its holder and the insertion of a fresh tool thereinto requires a certain skill, particularly as the space in the press available for the movement of the tool into and out of its holder is usually limited. It has been proposed to employ special tackle for the exchange of press tools such as stems, mandrels or punches. However, the handling of a tool with such tackle was hindered by the limited space available in the press in front of the tool. This limitation was also the reason why only a single tackle could be provided which had to be used both for the withdrawal of one tool and for the insertion of another, whereby the time required for the exchange of a tool was prolonged.

It is evident that the press must be at a standstill while a tool is exchanged. A modern press plant is generally designed for high output, and the quick and trouble-free exchange of press tools is therefore of great importance.

It is an object of the present invention to provide a press with improved built-in means for effecting change of a tool of the press.

The invention is particularly applicable to a metal extrusion press of the kind having a plurality of billet containers mounted on a common carrier which is movable in succession into a plurality of working positions in each of which a separate one of the containers is in register with the extrusion axis and the remaining container or containers are in parking stations offset from the extrusion axis and readily accessible from outside the press. The container or containers in the parking stations may then be cleaned and charged with a fresh billet, while a billet is being extruded from the container in the extrusion axis.

According to the invention, a tool clamping device is mounted on the container carrier of an extrusion press of the kind described, and the carrier is movable into a tool-changing position, intermediate the working positions, in which the clamping device is in register with the extrusion axis of the press.

Embodiments of the invention will now be described, by way of example, with reference to the accompanying drawings, in which:

FIG. 3 is a sectional view along the line III—III of FIG. 2 having parts not sectioned to illustrate specific features.

FIG. 4 is a perspective view of a constructional detail of the tool-clamping device shown in FIGS. 1–3.

Figures 1, 2:
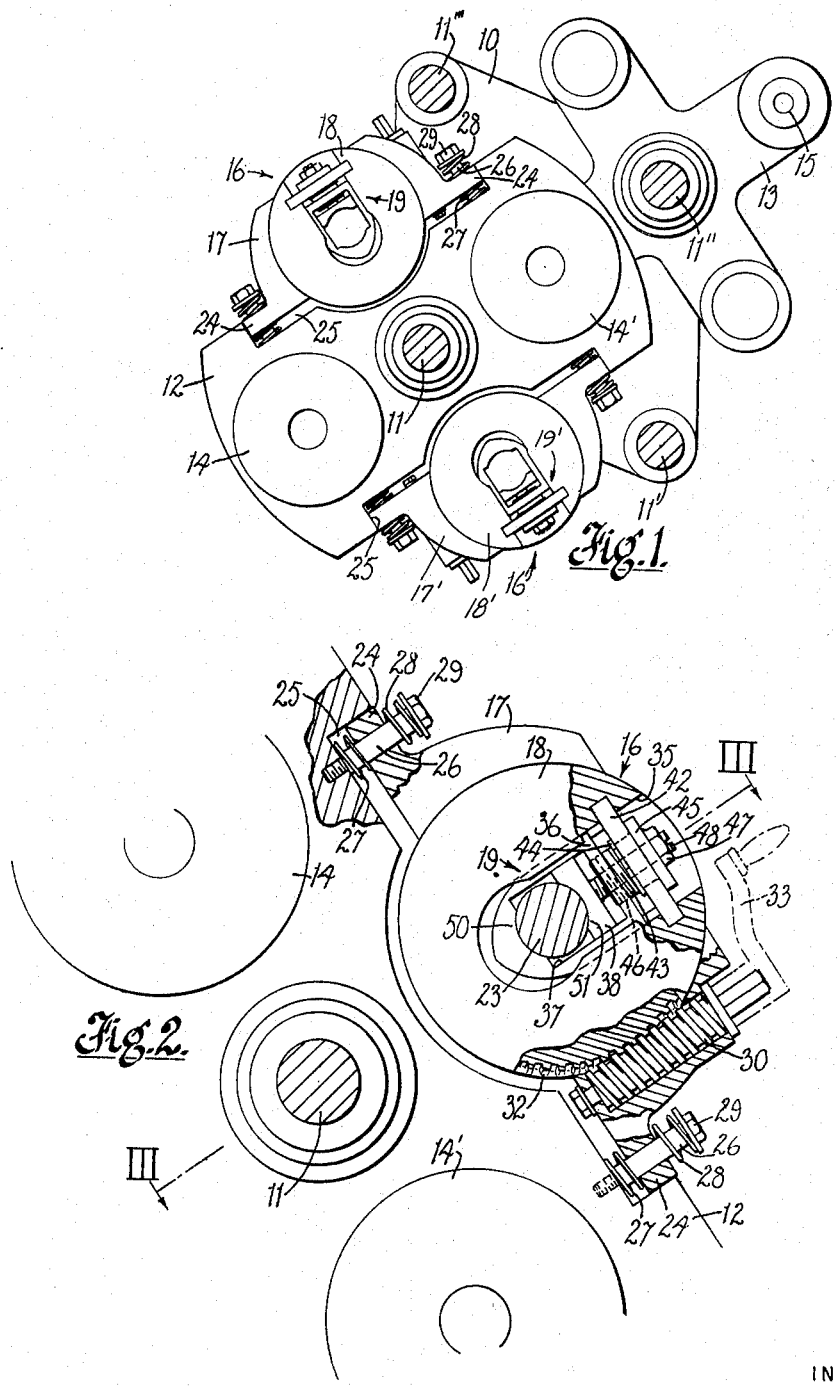
FIG. 1 is a transverse sectional view of a metal extrusion press having a billet container carrier fitted with tool-clamping devices according to the invention.
FIG. 2 is a view of part of the billet container carrier of FIG. 1, but on an enlarged scale, showing one of the devices in clamping engagement with the pressing stem of the press, with parts of the carrier cut away.

The extrusion press of FIG. 1 comprises a pressure platen 10, four tension columns 11, 11', 11" and 11''' connecting the platen 10 to a further platen (not shown) supporting a main hydraulic unit, a billet container carrier 12 rotatably mounted on one of the columns 11, and a die carrier 13 rotatably mounted on another of the columns 11". Two billet containers 14 and 14' are mounted on opposite sides of the carrier 12, and two dies 15 (only one of which is shown in FIG. 1) are mounted on opposite sides of the carrier 13. The carriers 12, 13 are rotatable, by means not shown, to register each of the containers and dies in turn with the centre line of the press. A pressing stem (23 in FIG. 2) is secured by a screw connection to a holder (not shown) attached to the main ram of the hydraulic unit, the pressing stem and holder being aligned along the centre line of the press.

The components of the press shown in FIG. 1, other than the tool-clamping devices, are of conventional construction and need not therefore be described further.

Two tool-clamping devices 16 and 16' are mounted on the billet container carrier 12, the devices being arranged symmetrically on opposite sides of the plane through the axes of the two containers 14. Each of the tool-clamping devices 16 comprises a housing 17, a drum 18 rotatably mounted in the housing, and gripper unit 19 mounted in the drum. The two-clamping devices 16 and 16' are so arranged on the carrier 12 that the axes of the drums 18 lie in a common circle centred at the rotational axis of the carrier 12 and passing through the centre line of the press.

As shown in FIG. 4, each housing 17 comprises two part-cylindrical side walls 20 arranged to embrace opposite sides of the periphery of the drum 18, an end wall 21 having an aperture 22 of a size to receive the free end of the pressing stem 23 (FIG. 3) of the press, and two base flanges 24 projecting from the side walls 20. The housing 17 makes a close sliding fit between the side walls of a recess 25 formed in the carrier 12, and four guide pins 26 extend through apertures in the base flanges 24 and are screwed into the base of the recess 25. The housing 17 is supported by coil springs mounted on the pins 26, each pin having a spring 27 compressed between the housing and the base of the recess 25 and a further spring 28 compressed between the housing and a head 29 on the outer end of the pin 26. The housing 17 is thus "floating" on the pins 26 and is free to move towards or away from the rotational axis of the carrier against the action of the springs 27, 28.

The drum 18 makes a close fit between the side walls 20 of the housing 17 and is rotatable by a worm 30 mounted in a bore 31 in one of the side walls 20 as shown in FIGS. 3 and 4, the worm 30 being engaged with teeth formed in the base of an annular recess 32 formed in the periphery of the drum. In FIG. 3, the part of the drum carrying the teeth and recess 32 is shown not in section.

Shaft 11 and tool 23 have also not been sectioned. The worm is shown here as driven by a crank handle 33, but alternatively may be driven by any suitable power driven means. The drum 18 is formed with an axial bore 34 aligned with the aperture 22 in the end wall 21 of the housing, and the drum is also formed with a recess 35 extending across the axis of the drum and opening out through the periphery of the drum.

The gripper unit 19 comprises an outer rectangular slide block 36 formed with a central transverse passageway 37, and an inner rectangular slide block 38 which is mounted so as to make a close sliding fit in the passageway 37. The outer block 36 is mounted as a close sliding fit in the recess 35 in the drum, with the transverse passageway 37 extending parallel to the axis of the drum. A coverplate 42 is secured to the drum 18 over the mouth of the recess 35, and a tubular spindle 43 having inner and outer threads extends through an opening in the cover plate 42. The spindle is provided with a shoulder 44 which engages the under surface of the cover plate 42, and a nut 45 on the spindle engages the top surface of the cover plate 42, so that the spindle 43 is free to rotate but is restrained against axial movement. The inner end of the spindle is screwed into an aperture 46 in the slide block 36, and the outer end of the spindle is formed with a hexagonal head 47 for engagement with an adjusting spanner.

A shaft 48 on the inner slide block 38 projects through the aperture 46 and is screwed inside the tubular spindle 43. The screw threads on the outer and inner surfaces of the spindle which engage the screw threads in the aperture 46 and on the shaft 48 respectively, are of equal pitch but of opposite hand, so that rotation of the spindle will move the two slide blocks 36, 38 equal distances in opposite directions. The inner wall of the passageway 37 in block 36 thus forms, in effect, a jaw 50 and the opposing wall of the block 38 forms, in effect, a jaw 51 adapted to co-operate with jaw 50 to grip therebetween a tool inserted into the passageway 37. For this purpose the jaws 50, 51 have a contour complementary to the side surface of the pressing stem 23.

During assembly of the gripper unit in the drum 18, the slide blocks 36, 38 are arranged so that the jaws 50, 51 are at equal distances from the axis of the drum 18, at opposite sides thereof. The jaws will remain equidistant from that axis also after adjustment by means of the spindle 43, since the jaws are always moved simultaneously through equal distances in opposite directions, as explained above.

When it is desired to replace the pressing stem 23, the carrier is first rotated into a tool-changing position in which the radial plane of the carrier containing the axis of the drum 18 of one of the tool clamping devices passes through the extension of the axis of the pressing stem 23. The pressing stem 23 is then advanced between the jaws 50, 51 and into the apertures 34, 22 in the drum 18 and housing 17 respectively, and the outer and inner slide blocks 36, 38 advanced by rotation of the spindle 43 to bring the jaws 50, 51 into clamping engagement with the stem 23 as shown in FIG. 3.

During operation of the press, heat conduction from the hot metal billets to the containers 14 and carrier 12 results in thermal expansion of the carrier. This expansion causes radial outward displacement of the tool clamping devices 16 and 16′, so that when the carrier is rotated into a tool-changing position the axis of the drum 18 of the associated device 16 will be offset from the axis of the pressing stem 23. The jaws 50, 51 are however symmetrically disposed on opposite sides of the axis of the drum 18, and adjustment of the spindle 43 causes simultaneous movement of the jaws through equal distances in opposite directions, as previously explained. Moreover, the jaws are arranged with their centre lines on a radial plane of the carrier, and the devices 16 and 16′ are displaceable bodily along this radial plane against the action of the springs 27, 28. Thus, adjustment of the spindle 43 in a direction to effect a clamping action, will initially cause movement of the two jaws until the jaw 50 engages the pressing stem. Thereafter the stem will prevent further movement of the jaw 50 in the clamping direction, and further adjustment of the spindle will result in radial displacement of the device into a position in which the drum 18 is co-axial with the pressing stem and the pressing stem is firmly clamped between the two jaws 50, 51.

When the pressing stem is firmly clamped in the gripper unit 19, the drum 18 is rotated by means of the worm drive 30, 33 in order to unscrew the pressing stem from its holder. After the pressing stem has been disconnected from the holder the carrier 12 is rotated to a position in which the gripper unit 16 is readily accessible from outside the press for removal of the stem therefrom. As shown in FIG. 2, gripper unit 16′ will be in position in the axis of the press in front of the mandrel holder when gripper unit 16 is rotated by carrier 12 outside the press axis.

During this time, the other clamping device 16′ on the carrier 12 is preferably fitted with a new pressing stem ready to be moved into the extrusion axis of the press. This occurs, as indicated above, by rotation of carrier 12. In this way the time required to replace a stem may be considerably reduced, with corresponding increase in the press output.

Figure 5:
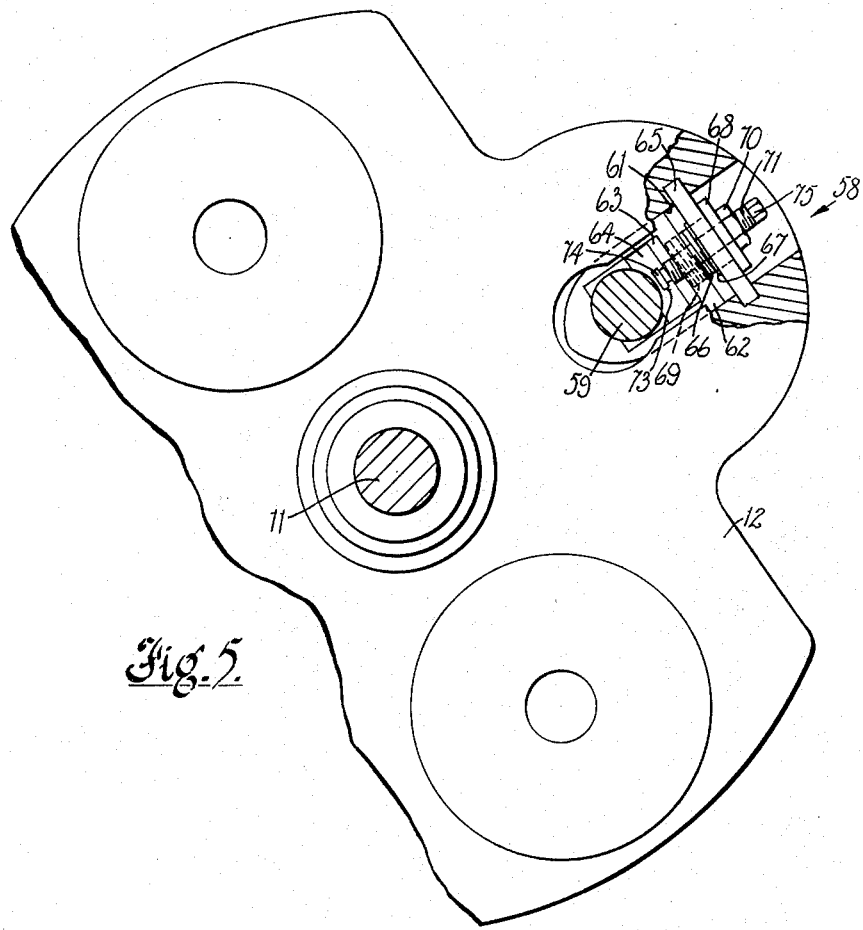
FIG. 5 is a view of a modified form of the tool-clamping device of FIGS. 1–4, fitted to a billet container carrier of an extrusion press.

The gripper unit 58 shown in FIG. 5 is suitable for use in removing a pressing stem 59 which is secured to a holder (not shown) by a splined connection. There is no need then to provide means for rotating the pressing stem, and the gripper unit 58 is mounted directly on the wall of the carrier 12.

The gripper unit 58 comprises an outer rectangular slide block 62 formed with a central transverse passageway 63, and an inner rectangular slide block 64 which is mounted as a close sliding fit in the passageway 63. The outer block 62 is radially movable in a recess 61 in the periphery of the carrier 12, and is arranged with the transverse passageway 63 extending parallel to the rotational axis of the carrier 12. A cover plate 65 is secured to the carrier 12 over the mouth of the recess 61, and a tubular spindle 66 having inner and outer threads, extends through an opening in the cover plate 65. The spindle 66 is provided with a shoulder 67 which engages the undersurface of the cover plate 65, and a nut 68 on the spindle engages the top surface of the cover plate 65, so that the spindle is free to rotate but is restrained against axial movement. The inner end of the spindle is screwed into an aperture 69 in the slide block 62, and the outer end of the spindle is formed with a hexagonal head 70 for engagement with an adjusting spanner. A screw-threaded shaft 71 is screwed into the tubular spindle 66, with the ends of the shaft projecting from the ends of the spindle. The radially inner end of the shaft 71 extends through an aperture 72 which opens into an internal recess 73 in the inner block 64, and a nut 74 is secured on the end of the shaft 71 within the recess 73. The nut 74 prevents axial movement of the shaft 71 relative to the inner block 64, but permits rotational movement of the shaft. The radially outer end of the shaft 71 is formed with a hexagonal head 75 for engagement by an adjusting spanner.

Rotation of the spindle 66 thus causes radial movement of the outer block 62, within the recess 61 and rotation of the shaft 71 causes radial movement of the inner block 64. The inner wall of the passageway 63 in the block 62 thus forms, in effect, a jaw 70 and the opposing wall of the block 64 forms, in effect, a jaw 71 adapted to co-operate with the jaw 70 to clamp a tool therebetween.

To remove the pressing stem 59, the carrier 12 is rotated into a tool-changing position in which the jaws 70, 71 are disposed on opposite sides of the centre line of the press. The pressing stem is then advanced between the jaws, and each of the blocks 62, 64 is advanced individually, by rotation of the spindle 66 and shaft 71 respectively, to engage the jaws against opposite sides of the stem.

Thermal expansion of the carrier would not affect the operation of the gripper unit 58, since the jaws are movable along a common radial plane of the carrier. Any displacement of the jaws due to this expansion can thus be compensated by radial adjustment of the jaws by means of the spindle 66 and shaft 71.

When the pressing stem is firmly clamped in the jaws, the holder is retracted to disengage the splined connection with the pressing stem. Alternatively the carrier may be displaced axially in a direction to disengage the splined connection. The carrier is then rotated to bring the gripper unit 58, together with the pressing stem clamped therein, into a position which is readily accessible from outside the press.

I claim:

1. In a press having a tool secured to a holder in the working axis of the press by a bayonet or screw connection and a billet container carrier rotatably mounted on the frame of the press; radial guide means on said carrier and a tool-clamping device mounted on said guide means for radial movement relative to the axis of the carrier, said tool-clamping device comprising a rotary member, a gripper unit mounted in the rotary member and drive means drivably connected to the rotary member.

2. In a press having a tool secured to a holder in the working axis of the press by a bayonet or screw connection and a billet container carrier rotatably mounted on the frame of the press; radial guide means on the carrier, a support mounted on the guide means for radial movement relative to the axis of the carrier, a drum rotatably mounted in the support, and a gripper unit mounted in the drum and adapted to grip said tool, said gripper unit comprising two jaws symmetrically disposed on opposite sides of the axis of the drum, and adjusting means coupled to said jaws and operative to move said jaws equal distances in opposite directions.

3. A press as set forth in claim 2, wherein said adjusting means comprises a tubular spindle, the outside surface of the spindle being formed with an outer screw thread and the inside surface of the spindle being formed with an inner screw thread, said inner and outer screw threads being of equal pitch and of opposite hand, and two coupling members attached one to each of said jaws, one of said coupling members being screwed on said outer screw thread and the other of said coupling members being screwed on said inner screw thread.

4. A press for working metal billets placed in a container of the press, by an operation in which a detachably mounted stem-shaped tool is used, said press having a plurality of billet container mounted on a common rotary carrier which is movable in succession into a plurality of positions in each of which one of the containers is in alignment with the working axis of the press, and the remainder of said containers are at parking stations offset from the working axis and accessible from outside the press, there being mounted on said container carrier a tool clamping device which, through rotation of said carrier, is moved between a tool gripping station and a tool releasing station, one of said tool stations being in the working axis of the press, and the other of said tool stations being offset from said working axis.

5. A press for working metal billets according to claim 4, in which a container carrier may have two tool changing devices so arranged relative to each other that one is in the working axis of the press while the other is at a parking station and readily accessible from the outside.

6. A press for working metal billets according to claim 5, in which two billet containers are arranged on one carrier and in which two tool clamping devices are arranged symmetrically on opposite sides of the plane through the axes of the two containers.

7. In a press having a tool secured to a holder in the working axis of the press by a rotatable connection, a carrier mounted on the frame of the press for rotation about an axis not coinciding with and parallel to said working axis, a gripper unit supported on said carrier and adapted to grip said tool outside said holder, and means for rotating said gripper unit 360° about the axis of said tool in opposite directions when in engagement with said tool, so as to make or break said connection, said carrier being rotatable between a position in which said gripper unit is arranged to grip said tool, and a further position in which said gripper unit is readily accessible for outside the press.

References Cited by the Examiner

UNITED STATES PATENTS

| | | | |
|---|---|---|---|
| 2,901,927 | 9/1959 | Morgan | 29—568 |
| 2,929,499 | 3/1960 | Turner | 207—1.1 |
| 3,052,011 | 9/1962 | Brainard et al. | 29—26 |
| 3,157,283 | 11/1964 | Maass et al. | 207—19 |

CHARLES W. LANHAM, *Primary Examiner.*

MICHAEL B. BRINDISI, *Examiner.*